US010102395B2

United States Patent
Hsu et al.

(10) Patent No.: US 10,102,395 B2
(45) Date of Patent: Oct. 16, 2018

(54) SYSTEM AND METHOD FOR CREATING AND TRANSITIONING TO MULTIPLE FACETS OF A SOCIAL MEDIA OBJECT IN A SOCIAL NETWORK

(71) Applicant: Flypfeed, Inc., San Francisco, CA (US)

(72) Inventors: Stephen Hsu, San Francisco, CA (US); Khanh Nguyen, San Francisco, CA (US)

(73) Assignees: Stephen Hsu, San Francisco, CA (US); Khanh Nguyen, San Francisco, CA (US)

( * ) Notice: Subject to any disclaimer, the term of this patent is extended or adjusted under 35 U.S.C. 154(b) by 325 days.

(21) Appl. No.: 15/071,454

(22) Filed: Mar. 16, 2016

(65) Prior Publication Data
US 2016/0283739 A1    Sep. 29, 2016

Related U.S. Application Data

(60) Provisional application No. 62/139,571, filed on Mar. 27, 2015, provisional application No. 62/150,115, filed on Apr. 20, 2015.

(51) Int. Cl.
| | |
|---|---|
| *G06F 21/62* | (2013.01) |
| *H04L 29/06* | (2006.01) |
| *G06F 21/60* | (2013.01) |
| *H04L 9/32* | (2006.01) |
| *G06F 3/0482* | (2013.01) |

(Continued)

(52) U.S. Cl.
CPC ........ *G06F 21/6245* (2013.01); *G06F 3/0482* (2013.01); *G06F 3/0483* (2013.01); *G06F 3/0485* (2013.01); *G06F 3/04883* (2013.01); *G06F 21/602* (2013.01); *G06Q 50/01* (2013.01); *H04L 9/32* (2013.01); *H04L 63/06* (2013.01);

(Continued)

(58) Field of Classification Search
CPC .............. G06F 21/6245; G06F 21/602; G06F 2221/2141; G06F 3/0482; G06F 2203/04802; G06F 3/04883; G06F 3/0483; G06F 3/0485; H04L 63/101; H04L 9/32; H04L 63/06; G06Q 50/01
See application file for complete search history.

(56) References Cited

U.S. PATENT DOCUMENTS

| | | | | |
|---|---|---|---|---|
| 2010/0312714 | A1* | 12/2010 | Ourega | G06Q 10/10 705/319 |
| 2011/0197255 | A1* | 8/2011 | DiCrescenzo | G06F 21/6263 726/1 |

(Continued)

*Primary Examiner* — Baotran N To
(74) *Attorney, Agent, or Firm* — Procopio, Cory, Hargreaves & Savitch LLP

(57) ABSTRACT

Systems and methods for facilitating users to create multi-faceted social media objects (e.g., text, images, videos, etc.) with one public facing front side and multiple secondary facets that have optional privacy controls are provided. Users can scroll down a feed and perform gestures on each social media object to transition them to flipsides to view optionally private content in an intuitive manner. Graphical animations for transitioning from the front side of the social media object to the secondary facets can be simultaneously viewed within the feed interface. This enables a user to create a publicly visible social media object and essentially hide a message on the flipside(s) for selected other users to access. The hidden message may be contextual to the public side.

12 Claims, 10 Drawing Sheets

(51) Int. Cl.
*G06Q 50/00* (2012.01)
*G06F 3/0488* (2013.01)
*G06F 3/0483* (2013.01)
*G06F 3/0485* (2013.01)

(52) U.S. Cl.
CPC .. *H04L 63/101* (2013.01); *G06F 2203/04802* (2013.01); *G06F 2221/2141* (2013.01)

(56) References Cited

U.S. PATENT DOCUMENTS

| | | | | |
|---|---|---|---|---|
| 2013/0198285 | A1* | 8/2013 | Ourega | G06Q 10/107 709/204 |
| 2014/0189541 | A1* | 7/2014 | Chen | H04W 4/21 715/753 |
| 2014/0337762 | A1* | 11/2014 | Salerno | G06Q 10/10 715/753 |

* cited by examiner

SYSTEM AND METHOD FOR CREATING AND TRANSITIONING TO MULTIPLE FACETS OF A SOCIAL MEDIA OBJECT IN A SOCIAL NETWORK

CROSS REFERENCE TO RELATED APPLICATIONS

This U.S. patent application is based on and claims the benefit of domestic priority under 35 U.S.C 119(e) from provisional U.S. patent application No. 62/139,571, filed on Mar. 27, 2015, as well as from provisional U.S. patent application No. 62/150,115, filed on Apr. 20, 2015. The entire disclosures of both applications are incorporated by reference herein in their entirety.

BACKGROUND

Technical Field

The present disclosure relates to the fields of social networks and mobile device touchscreen applications. More specifically, the present disclosure comprises an application whereby a user creates multiple facets to a social media object with one public facing side and multiple secondary facets that are made optionally private depending on the social media object author's specifications.

Related Art

There are many known forms of social networks on mobile application platforms in the related art. Most of these related art implementations involve user interfaces whereby social media objects, which may include text, photos, or video, are arranged in a vertical feed format. Users can scroll down the feed of social media objects with a vertical swiping gesture on the mobile device touchscreen. As the user swipes upward on the touchscreen, the user interface scrolls down the feed, thereby displaying more social media objects.

In related art implementations, the social media objects themselves may be visible to all users who are either following the social media object author or are friends of the author. In related art implementations, the object author can optionally make an object visible to only a select group of people (e.g., a post, image, or video only accessible by a few people). Thus, the choices the author has when publishing a social media object can involve making a single social media object publicly visible or privately visible.

SUMMARY

Example implementations of the present disclosure are directed to creating multiple facets for a single social media object, thereby rendering a first facet that is publicly visible and multiple secondary facets that are optionally private. A user who has access to the flipside (the secondary facets) of the social media object can perform a gesture on the mobile device touchscreen to transition the public front side (the first facet) to the optionally private flipside (the secondary facets).

Example implementations can include a social network on a mobile application platform whereby users create multiple facets of a social media social media object, which can include a first facet as a public facing side, and multiple secondary facets that are optionally private depending on the specification of the author of the social media object. If the author does not wish to make the secondary facets to be private, the secondary facets will be visible to all users.

Users who have access to the secondary facets of the social media object can perform a gesture on the touchscreen to transition from the first facet to the secondary facet. Each social media object can be transitioned in the above manner, and each object can contain text, images, videos, advertisements, and other online media. The front, public facing side of the social media object can be shared to other social networks, wherein the private flipside is not shared. The social media object can be presented in a vertical feed format so users can scroll down the screen, making any desired number of objects transition to the flipside.

Aspects of the present disclosure can include a non-transitory computer readable medium storing instructions for executing a process. The instructions may involve providing a social media object comprising a first facet configured to be displayed publicly through a social media application, the first facet linked to a secondary facet configured to be accessible through the first facet by an input to the social media object. For a processing of the input to the social media object to transition the first facet to the secondary facet, the instructions may further involve determining if access is to be granted to the secondary facet; and for a determination that access is to be granted, configuring the social media application to transition the social media object from the first facet to the secondary facet.

Aspects of the present disclosure can include a method that may involve providing a social media object having a first facet configured to be displayed publicly through a social media application, the first facet linked to a secondary facet configured to be accessible through the first facet by an input to the social media object. For a processing of the input to the social media object to transition the first facet to the secondary facet, the method may further involve determining if access is to be granted to the secondary facet; and for a determination that access is to be granted, configuring the social media application to transition the social media object from the first facet to the secondary facet.

Aspects of the present disclosure can further include an apparatus, which can involve a processor, configured to provide a social media object having a first facet configured to be displayed publicly through a social media application, the first facet linked to a secondary facet configured to be accessible through the first facet by an input to the social media object. For a processing of the input to the social media object to transition the first facet to the secondary facet, the processor may be further configured to determine if access is to be granted to the secondary facet; and for a determination that access is to be granted, configure the social media application to transition the social media object from the first facet to the secondary facet.

Aspects of the present disclosure can further include a non-transitory computer readable medium storing instructions for executing a process. The instructions can include providing a first interface configured to receive first data including first social media information utilized in a first facet of a social media object, the first facet configured to be displayed publicly through a social media application; providing a second interface configured to receive second data including second social media information utilized in a secondary facet of the social media object and access information indicative of one or more users of the social media application having access to the secondary facet; generating the social media object, the social media object comprising the first facet and the secondary facet, and providing the social media object to the social media application, the social media application configured to display the first facet of the social media object and to transition the social media object from the first facet to the secondary facet only to the one or more users of the social media application having access to the secondary facet.

Aspects of the present disclosure can further include a method, which can include providing a first interface configured to receive first data including first social media information utilized in a first facet of a social media object, the first facet configured to be displayed publicly through a social media application; providing a second interface configured to receive second data including second social media information utilized in a secondary facet of the social media object and access information indicative of one or more users of the social media application having access to the secondary facet; generating the social media object, the social media object comprising the first facet and the secondary facet, and providing the social media object to the social media application, the social media application configured to display the first facet of the social media object and to transition the social media object from the first facet to the secondary facet only to the one or more users of the social media application having access to the secondary facet.

DETAILED DESCRIPTION

Figure 1:
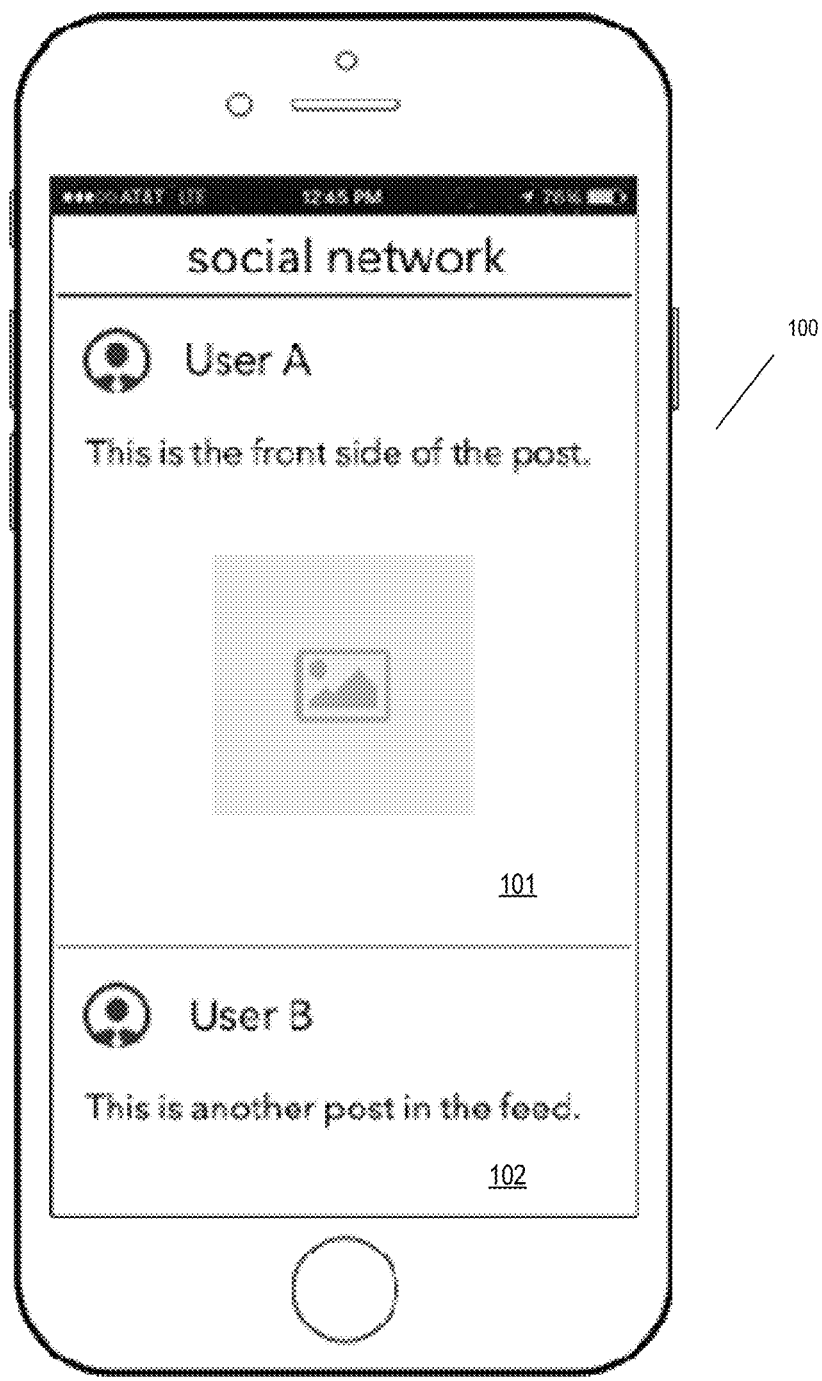
FIG. 1 shows an illustrative screen provided by a series of social media objects in the social network, displayed in a feed-based user interface in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms "social application" and "social media application" may also be used interchangeably, as well as the terms "social media object" and "social media post". As described in the present disclosure, the first facet may be referred to as the front side of a social media post that is displayed publicly through a social media application, and the secondary facet(s) may be referred to as the flipside of the same social media post that is configured to be accessed by a subset of users of the social media application.

In related art implementations, a social media object may only be made public or private. The only choices the author has when publishing a social media object can involve making a single social media object publicly visible or privately visible. The related art has no implementations to associate a public social media object with a private social media object that is accessible to only a selected group of users.

In example implementations, comments on a social media object are social media objects with text, images, videos, advertisements and other online media as well. Users who post comments in response to the original social media object have the option to make the flipside of the comment public or private, similar to the behavior of the parent object. As a result, users with the appropriate access to flipsides to can follow stories told on the parent social media object all the way down through a tree of social media objects, with the parent social media object as the root. Inversely, users who have access to the child social media objects gain access to their parents as well. Such example implementations can address the aforementioned problems by allowing users to post private comments or other social media objects on a public social media object, as well as having a private social media object within the public social media object.

Example implementations can transition between the public first facet of the social media object to the private secondary facet of the social media object through a transition animation. A transition animation represents the transition from one side to the next while a user views social media objects in the feed. Systems, apparatuses, methods and example implementations described herein are generally directed to mobile touch screen applications and social networks. Systems, apparatuses, methods and example implementations described herein are generally directed to mobile touch screen applications and social networks.

Social applications are networks where users can post content that is visible to a wide public audience. As these applications have grown in popularity, users can gain access to the social media objects of any other user, and many users have become more reticent to posting what they truly wish to express. Such applications has caused a drop-off in user engagement in population segments, such as teenagers who now shy away from social media applications because their parents are now able to access their posts.

Related art social applications have emerged to provide venues of anonymity and privacy. However, in converse to the public models of other, more public social media applications, users of these applications do not have an identity in the application and the conversations are limited to small groups of people (e.g., location based).

Thus, a problem for many users is that they have to use a public social network to post content they wish to display publicly, and then use a separate private social network to share information to smaller groups of people. Their identity on one social application is completely separate from their identity on the other social application, and thus the user is compelled to utilize multiple applications to manage their communication channels. Thus, the fundamental problem of social media applications is that either the applications allow for private social posting or for public social posting, but do not allow for the facilitation of both networks within the same application, nor is there any privacy control to facilitate the privacy control of the social media object according to the desired privacy setting.

Example implementations address the problem of social media applications by unifying the identity profile and providing one social network to create a public versus a private social media object. When users publish a social media object, the user creates a publicly visible side of the object as well as optionally private facets of the social media object. All users can see the public side, but only people the users explicitly select can see the private side of the social media object. In addition, the public side may be shared to any of the public social networks and other online networks for an even wider audience to see, while maintaining the private side of the social media for select users.

In example implementations, the user can create publicly visible and privately visible content from one application instead of multiple. Since each social media object has a flipside (the secondary facet), the flipside content can be relevant to the publicly visible side, adding a facet of context that does not exist today in the public versus private concept. Further, users can scroll down the feed while transitioning social media objects to their flipsides seamlessly, creating an engaging experience with interactive social media objects. Further, advertisements may appear during the transitions, but not in the main feed itself, allowing for a sleeker ad-free user experience in the feed interface.

When users publish social media objects, they create a publicly visible side of the social media object as well as optionally private facets of the object. Everyone can see the public side, but only people the users select can see the private facets. Those selected users will see the public side in the feed interface, and if such wish to see the flipside, the user transitions the social media object by performing a gesture on the touchscreen. Other users who do not have the proper security rights will not be able to see content on the flipside.

Systems and methods for enabling users to create multifaceted social media objects that have privacy controls on every secondary side are provided herein. Users can scroll down a feed and transition social media objects to view optionally private content on the flipsides in an intuitive manner. Example implementations can be implemented by an application running on an electronic device. The application is a social media type of application that aggregates social media objects from a social network of a user into a feed interface. Users create social media objects that have a public facing side and multiple secondary facets that may be accessible by a select group of users. For example, the application can present "User A" with a series of social media objects from various members of the social network. One of those social media objects describes the excitement of "User B" about going to a concert, along with an image of an album cover of a music artist. The footnote on the social media object says "Only User A can see the flipside," indicating nobody else has access to a hidden message on the flipside. User A transitions the social media object by performing a gesture and immediately a video of the concert starts playing on the flipside along with a message that says, "Wish you were here, User A!" Other users who attempt to transition the social media object will have their access denied.

The content in each social media object can be any suitable media such as, for example, text, images, video media, audio media, advertisements, or e-commerce activities. Each social media object is created by a user within the social network application. Each social media object can be succinctly represented by a single card within the feed interface. When transitioned by performing a gesture on the social media object, a transition animation takes the user to a view of one of multiple secondary views of the social media object. Content on those secondary views only displays to the user if he or she has been given access to it by the object author. If access has not been granted, a message stating as such displays instead of the content. The user can transition back to the first side of the social media object by performing a gesture on the touchscreen. Each side of the social media object can contain text, images, video media, audio media, advertisements, or e-commerce activities. Hence, when a social media object is received in a client device, the social media object can be flipped, but only "credentialed" users can see the content on the flipside. If the user is not credentialed, there is a message stating they do not have access.

In an example implementation, the flip is a transition which can include a transition animation in which either a right half or a left half of a currently visible post folds onto its other half, and as the currently visible side folds on to itself, a different side of the post unfolds in place of the current side. The user can flip through posts by quickly inputting touch gestures (e.g., left or right swiping motions) on the device as the user scrolls down the feed. This flip can provide the user with the impression he is flipping over cards within the feed to see the other side (i.e., the "flipside").

FIG. 1 shows an illustrative screen provided by a series of social media objects in the social network, displayed in a feed-based user interface in accordance with an example implementation. In a mobile device 100, the user loaded a social media application, which has displayed social media objects 101 and 102. The social media object 101 displayed in FIG. 1 is a first facet indicative of a front, public side.

Figure 2:
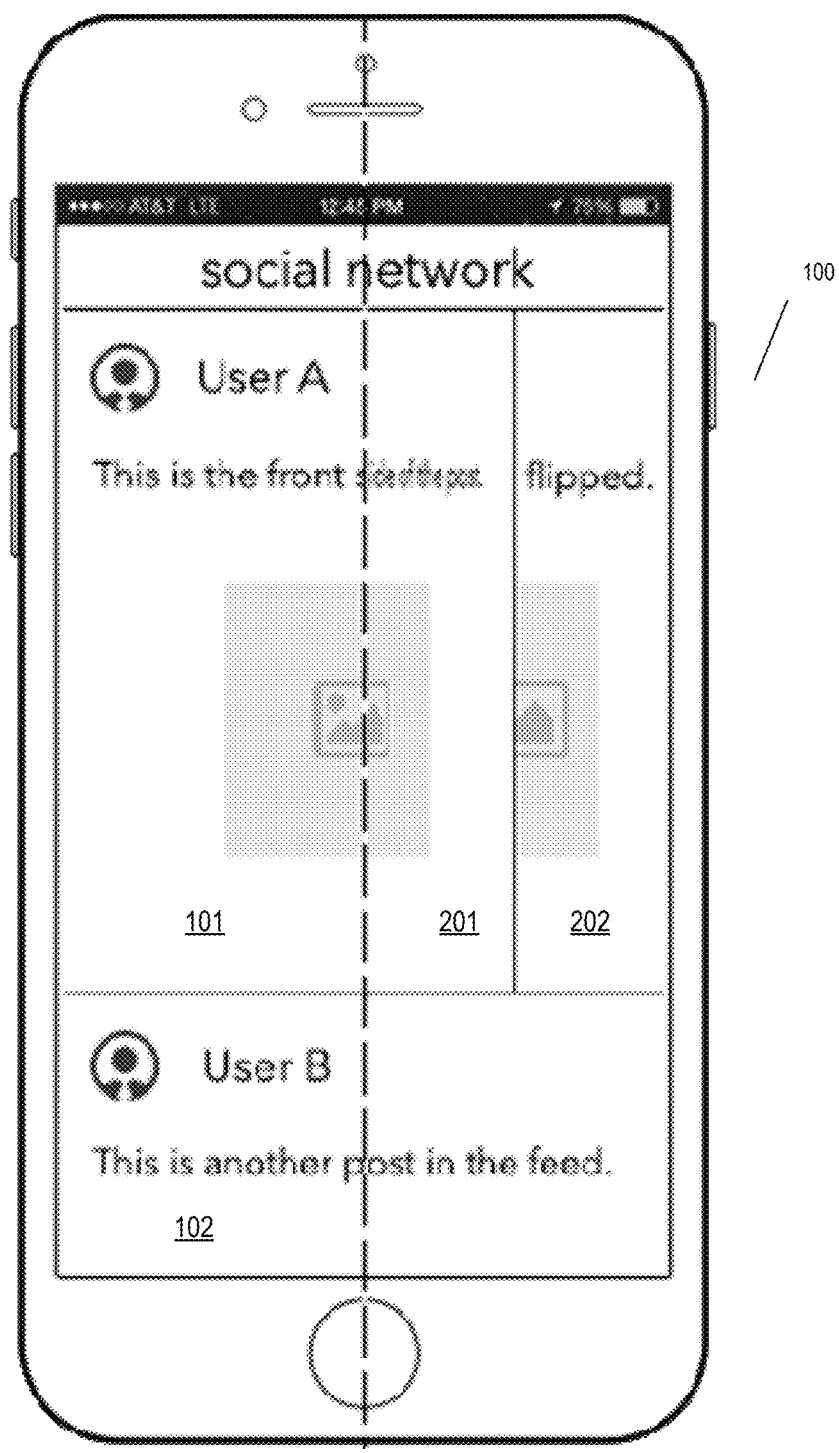
FIG. 2 shows a possible flip transition animation of the social media object when a user flips the object to its other side in accordance with an example implementation.

FIG. 2 shows a possible flip transition animation of the social media object when a user flips the object to its other side in accordance with an example implementation. In the example of FIG. 2, a user having access makes a gesture to reveal the flipside of the social media object. In response to the gesture, a transition 201 is conducted to convert the social media object from the first facet 101 to the secondary facet 202 that is directed to the user for the flipside. The secondary facet 202 may be an aspect of the social media object that is only accessible to certain users. Should the user not have access to the secondary facet 202, then the first facet 101 can remain static without undergoing the transition.

Figure 3:
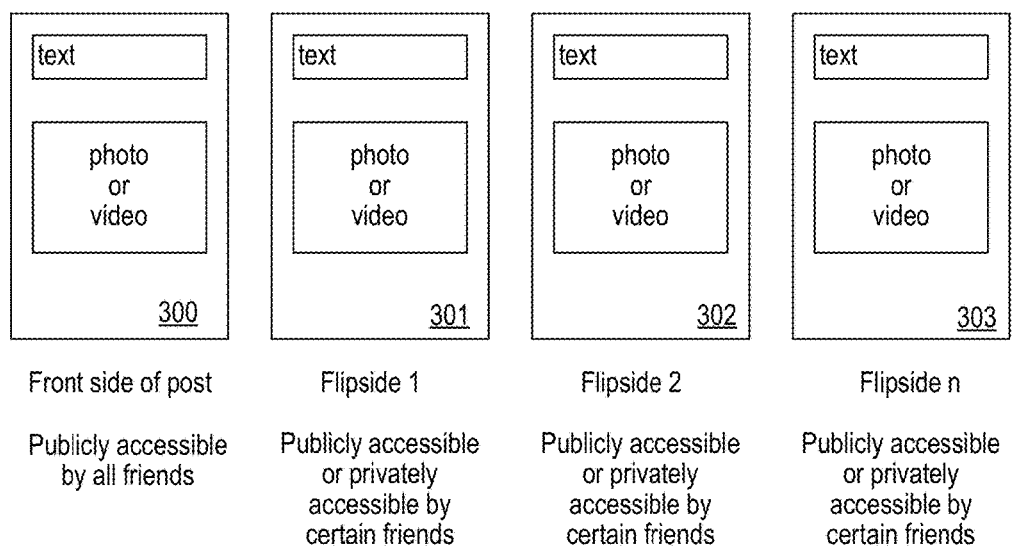
FIG. 3 illustrates how a social media object is comprised of the front side, which is publicly accessible by other users, and the additional flipsides, which are optionally made private, in accordance with an example implementation.

FIG. 3 illustrates how a social media object is comprised of the front side, which is publicly accessible by other users, and the additional flipsides, which are optionally made private, in accordance with an example implementation. Social media objects can include text, images, videos, advertisements and other online media as well.

In example implementations, the first facet 300 is the front side of the social media object, while the other secondary facets 301, 302 and 303 represent the flipside of the social media object. In the example of FIG. 3, a single social media object may have multiple facets 301, 302 and 303, each of which can be directed to be accessible to only a subset of users. For example, secondary facet 301 can be accessible to friend A, secondary facet 302 can be directed to friends A and C, and secondary facet 303 may be directed to friends B and D. In this manner, the first facet 300 can remain public for all users of the social media application, whereas the secondary facets 301, 302 and 303 are only accessible by certain friends of the user. The user of the social media object can configure the secondary facets to be accessible by any user in accordance with the desired accessibility. Further, secondary facets may also be configured by the user to be accessible to the public, depending on the desired implementation.

In example implementations, users who post comments in response to the original social media object have the option to make the flipside of the comment public or private, similar to the behavior of the parent object. As a result, users with the appropriate access to flipsides to can follow stories told on the parent social media object all the way down through a tree of social media objects, with the parent social media object as the root.

Figure 4:
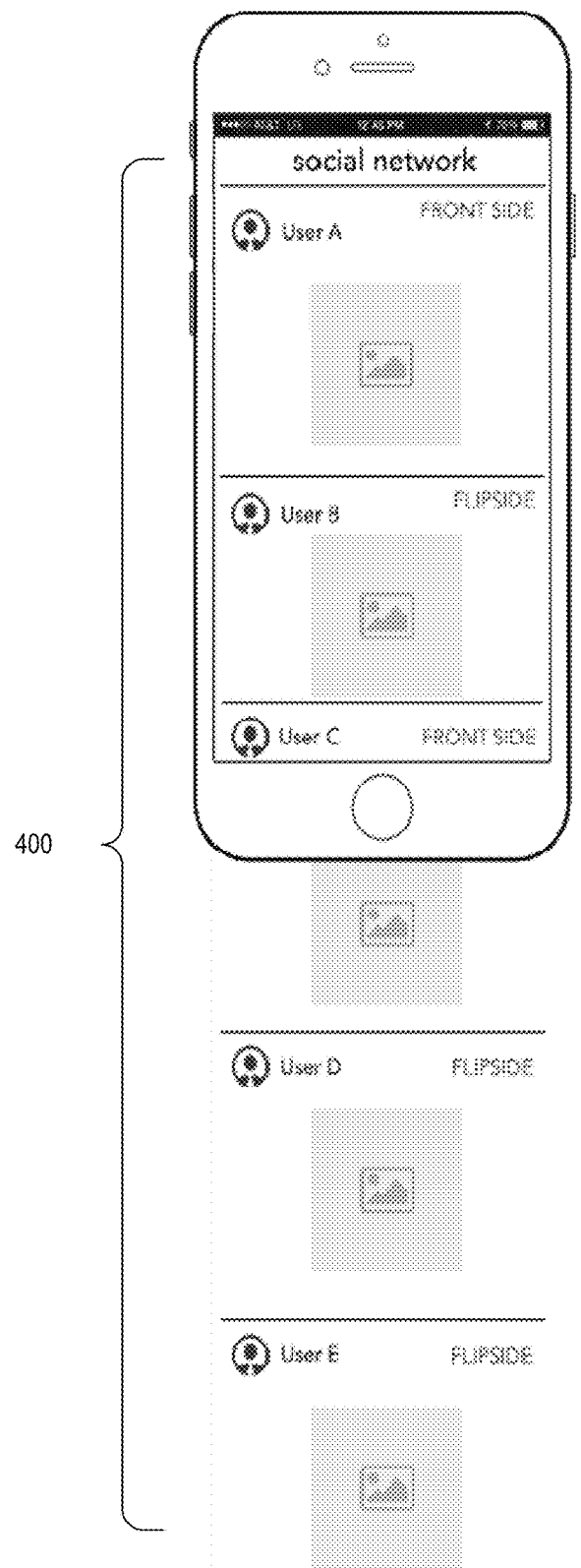
FIG. 4 illustrates a series of social media objects that have and have not been transitioned in the feed to illustrate how the objects can be displayed in varying states simultaneously in accordance with an example implementation.

FIG. 4 illustrates a series of social media objects that have and have not been transitioned in the feed to illustrate how the objects can be displayed in varying states simultaneously, in accordance with an example implementation. Example implementations can be applied as a social media object in any social media application. In an example application as illustrated in FIG. 4 having a plurality of social media objects, example implementations of social media objects as described herein can be utilized in the social media application, thereby facilitating the possibility of viewing any mixture of front sides and flipsides of the social media objects available to the user.

Figures 5A, 5B:
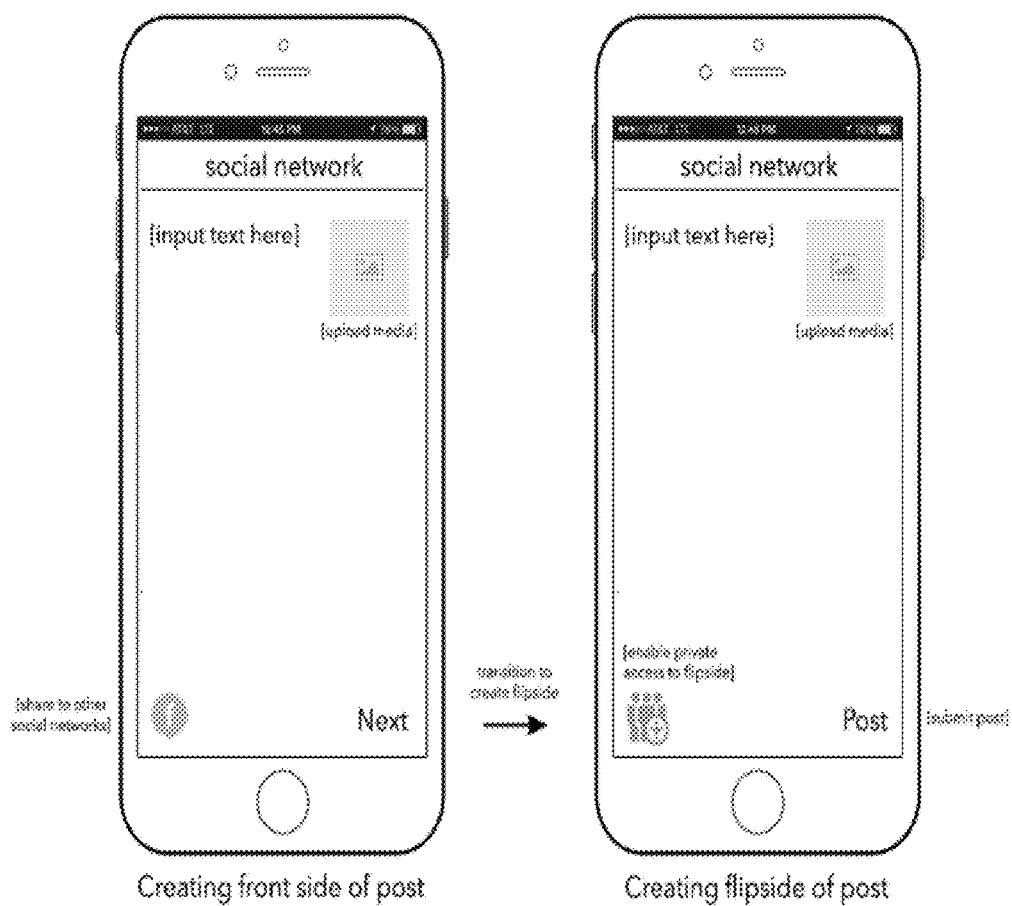
FIGS. 5A to 5C illustrate an example process of creating a social media object, including the public side and the private side in accordance with an example implementation.
Figure 5C:
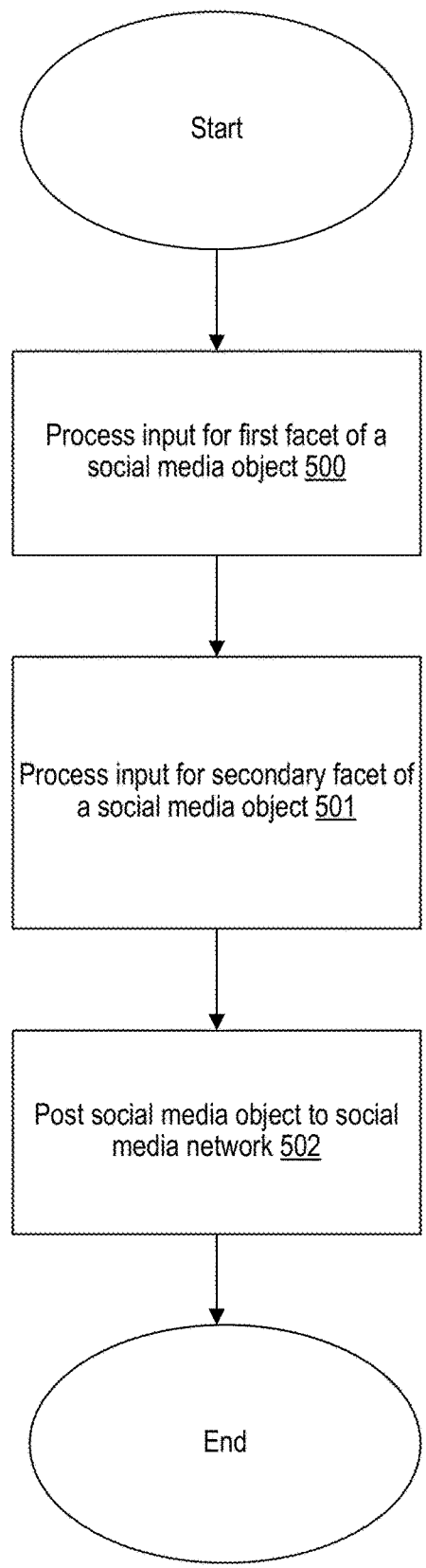

FIGS. 5A to 5C illustrate an example process of creating a social media object, including the public side and the private side in accordance with an example implementation. In the example as illustrated in FIG. 5A, an interface for an editable social media object is presented for creating the front side of the social media object. The modification of the front side of the social media object can be implemented by any method according to the desired implementation, either as being through the social media application or through a module that modifies the social media application to create the front side of the social media object.

In the example of FIG. 5B, an interface for the flipside of the editable social media object is presented for creating the flipside of the social media object. The modification of the flipside of the social media object can be implemented by any method according to the desired implementation, either as being through the social media application or through a module that modifies the social media application to create the flipside of the social media object. The interface of the flipside of the social media object can facilitate a selection of specific friends or users within the social media application that are given access to the flipside, while disabling access to the flipside by any user that has not been selected.

FIG. 5C illustrates an example flow diagram for the interface of a social media application, in accordance with an example implementation. At 500, the social media application of the user device processes input for a first facet (the public front side) of the social media object as illustrated in FIG. 5A, which can involve text, video, pictures, and so on. At 501, the social media application of the user device processes input for the secondary facet (the private flipside) of the social media object, which can involve the same types of input as the first facet, as well as security settings (e.g. private or public) and a selection of users that can access the secondary facet. At 502, once the first facet and the secondary facet(s) are complete, the social media application processes the input for posting the social media object, and then posts the social media object to the social media network associated with the social media application.

Figure 6:
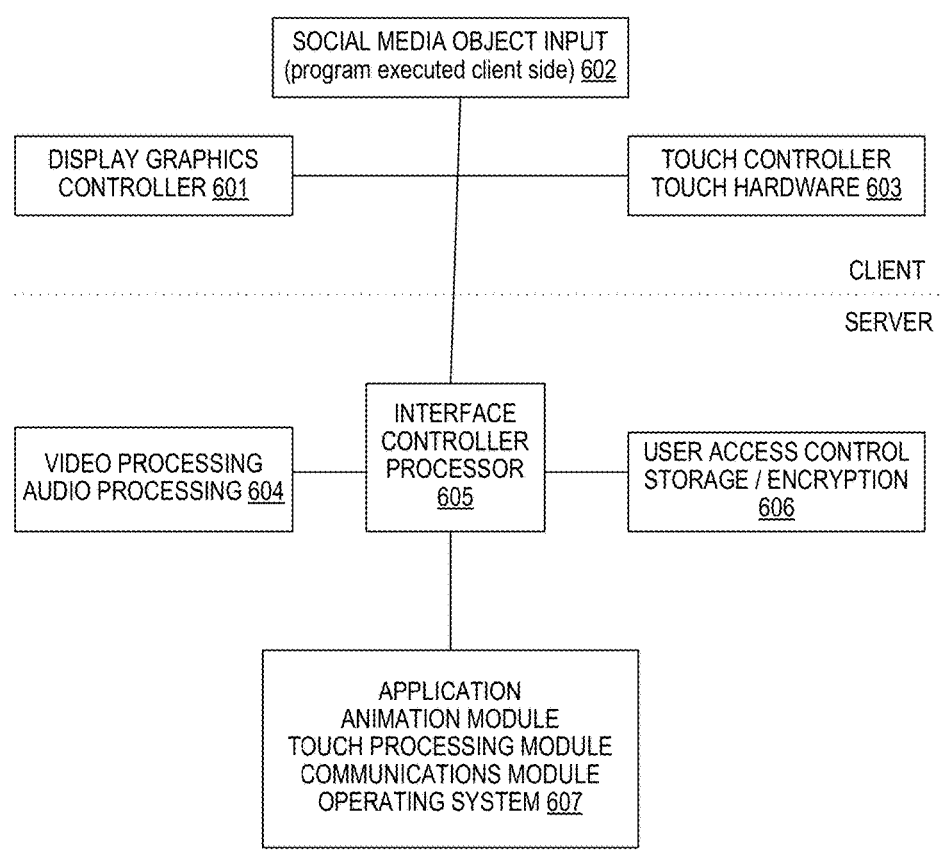
FIG. 6 illustrates the system architecture in which touchscreen interactions performed on the client side are managed on the server side, which stores encrypted assets and controls access by users, in accordance with an example implementation.

FIG. 6 illustrates the system architecture in which touch-screen interactions performed on the client side can be managed on the server side, which stores encrypted assets and controls access by users, in accordance with an example implementation. The client side of the system can be facilitated by any user device (e.g. mobile phone, laptop, desktop, etc.) and can involve a display graphics controller 601, an application to facilitate input for a social media object 602, and depending on the desired implementation, a touch controller and/or related touch hardware 603. The server side of the system can be facilitate by any method according to the desired implementation (e.g. server, cloud, data center, etc.), and can involve processing for video and audio 604, an interface controller processor 605 to process input from the client side, storage and encryption for maintenance of user access control 606, and an application layer 607 to process animations, touch processing, communications, operating system functions and so on.

Figure 7:
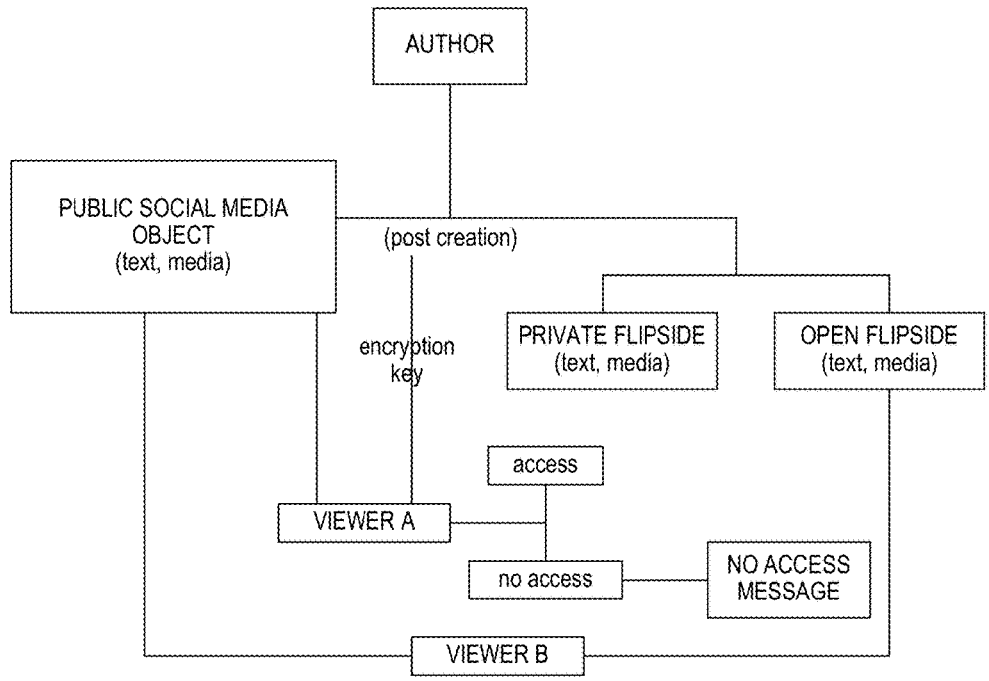
FIG. 7 illustrates an example of the access control flow of an author creating flipside objects that are either accessible or not accessible, in accordance with an example implementation.

FIG. 7 illustrates an example of the access control flow of an Author creating flipside objects that are either accessible or not accessible by Viewer A and Viewer B, both of whom can access the public object, in accordance with an example implementation. If the flipside has been made private by the Author, Viewer A must have an encryption key to access it as described herein. If access is not permitted, a message indicating that access is denied may also be provided through the social media application.

Figure 8:
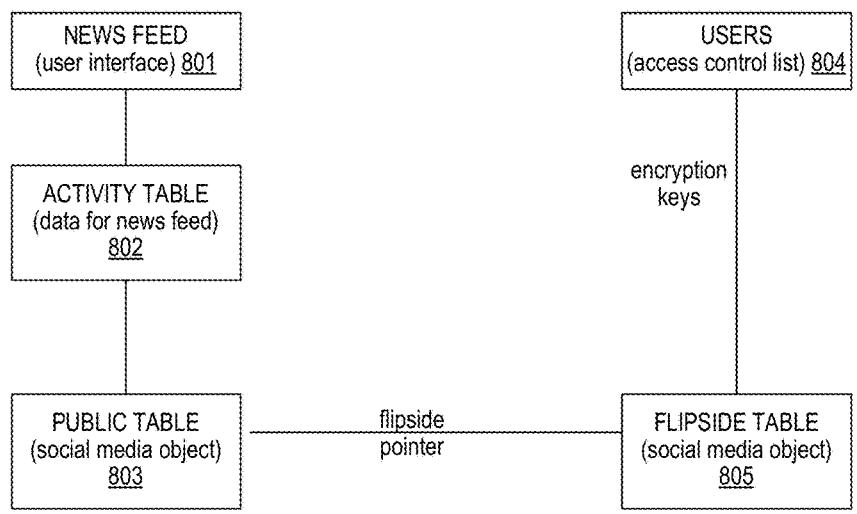
FIG. 8 illustrates the association between every public object with a corresponding flipside object, which is accessible by users with encryption keys as specified by the access control list in accordance with an example implementation.

FIG. 8 illustrates the association between every public object with a corresponding flipside object, which is accessible by users with encryption keys as specified by the access control list in accordance with an example implementation. The server side of the system architecture manages access to the social media object via an access control list and encryption. The front side of the social media object may be associated with its own table of social media objects for a specified user, as well as an activity table. Each flipside is also associated with its own table. An encryption key can be required to access the flipside, and is given to users who have been given access by the author. The encryption scheme can be any scheme known to one of ordinary skill in the art (e.g., RSA, Blowfish), depending on the desired implementation.

In example implementations, the server side of the system architecture manages the public aspect of the social media application for each user, which can include an interface to facilitate a news feed 801, an activity table to provide data for the news feed 802, and a public table 803 to facilitate the provisions of social media objects to each user through the social media application. Public table 803 may also link the first facet of the social media object to a secondary facet that can be accessed by specified users through the user of a pointer. The server side of the system architecture also facilitates the private aspect of the social media application for each user, which can include an access control list 804 indicating what users can access corresponding secondary facets of the social media object, and can associate users with encryption keys. Flipside table 805 manages the secondary facets of the social media object and links the first facets to the second facets.

Figure 9A:
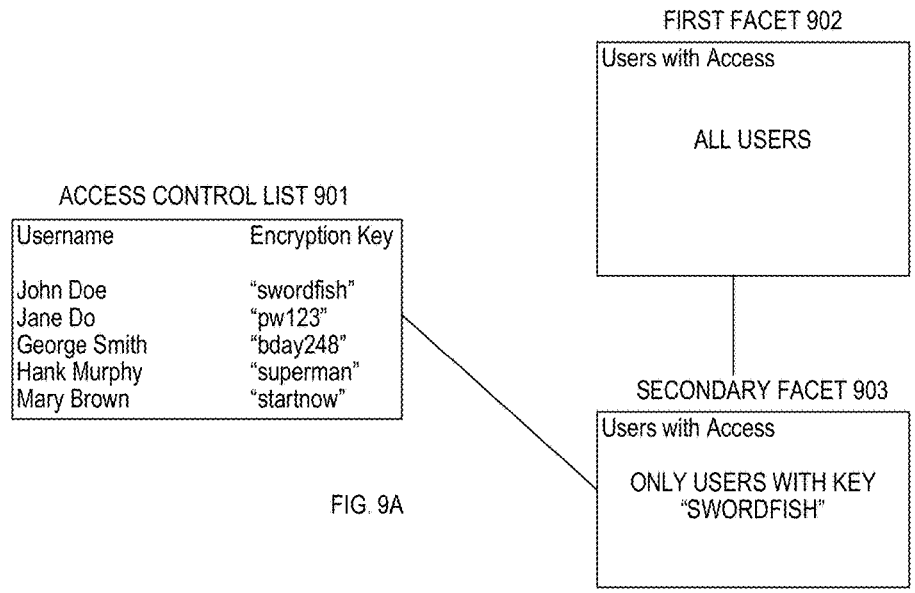
FIG. 9A illustrates an example of the access control list that allows users to access the flipside object using encryption keys in accordance with an example implementation.

FIG. 9A illustrates an example of the access control list that allows users to access the flipside object using encryption keys in accordance with an example implementation. An access control list 901 can be maintained on the server side of the system architecture and can associate usernames of the social media network to unique encryption keys as illustrated in FIG. 9A. The social media object has a first facet 902 that is accessible to the public and a secondary facet 903 which is accessible only to selected users. In the example, only the user(s) with the correct encryption key can access the secondary facet 903, however other methods can be utilized to implement the access control depending on the desired implementation.

Figure 9B:
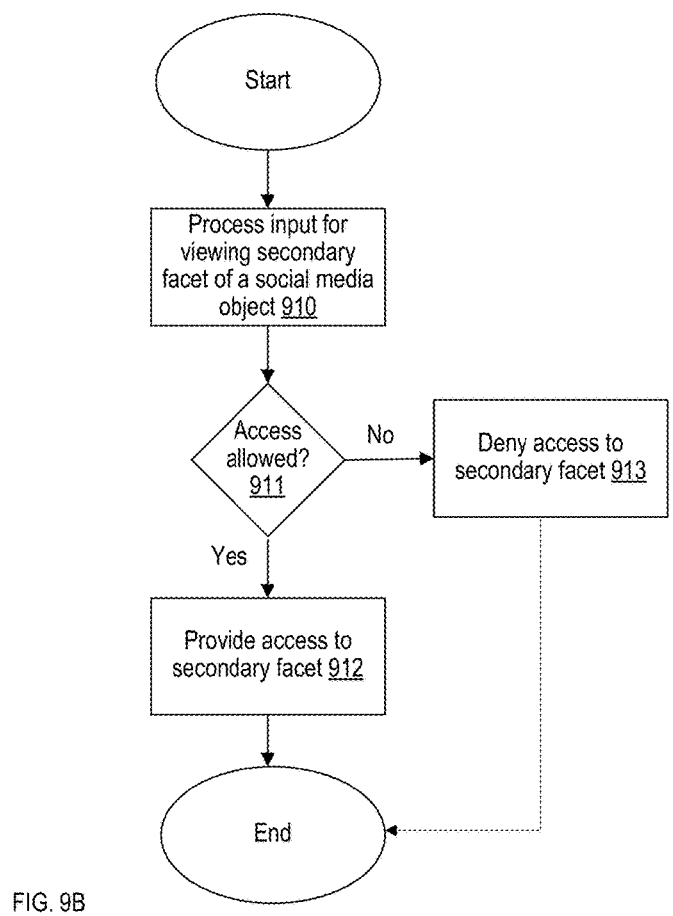
FIG. 9B illustrates an example flow diagram for the server side of the system architecture for facilitating access to the secondary facets, in accordance with an example implementation.

FIG. 9B illustrates an example flow diagram for the server side of the system architecture for facilitating access to the secondary facets, in accordance with an example implementation. At 910, a user submits input for viewing the flipside, or the secondary facet of a social media access. The server side of the system architecture processes the input and determines from the flipside table 911 if access is allowed. If so (Yes), then the flow proceeds to 912 wherein the server side facilitates access for the client device to the secondary facet. Otherwise (No) the flow proceeds to 913 wherein access is denied to the secondary facet through a message indicating that access is denied, or by other methods depending on the desired implementation.

Figure 10:
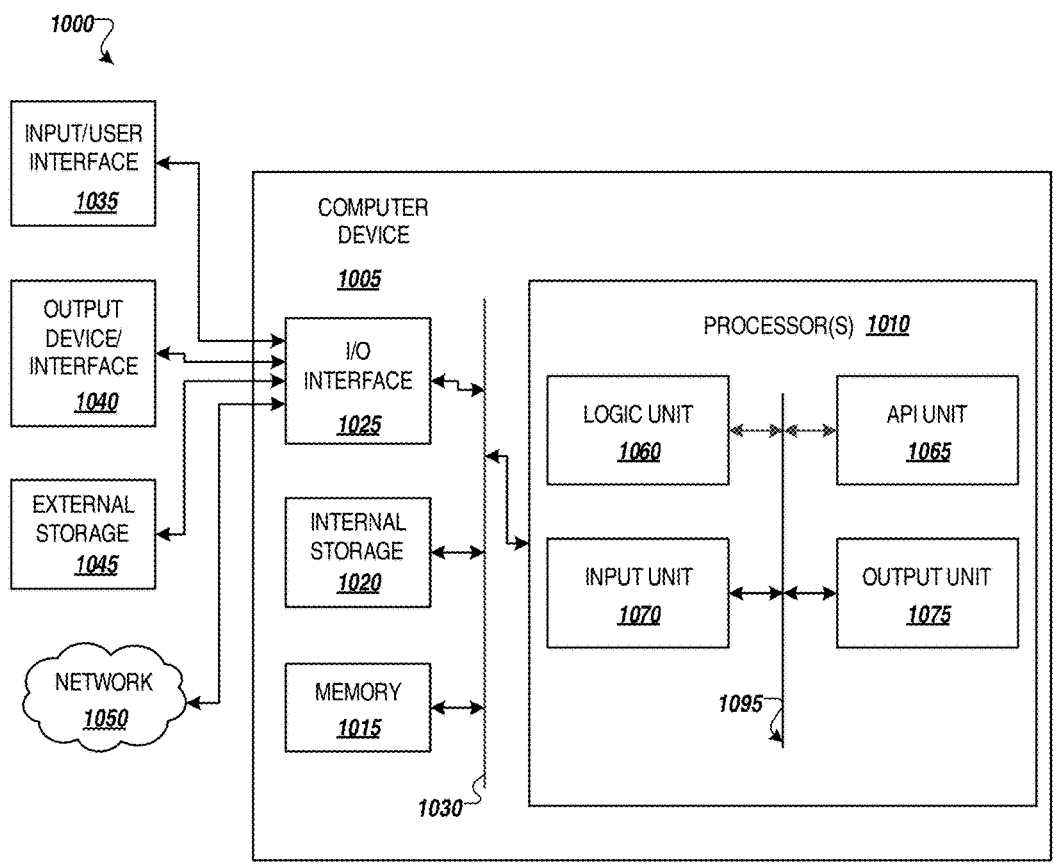
FIG. 10 illustrates an example computing environment with an example computer device suitable for use in example implementations of either the client side or the server side.

FIG. 10 illustrates an example computing environment with an example computer device suitable for use in example implementations of either the client side or the server side. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

In example implementations, computer device 1005 is configured to facilitate the functionality of the client side of the system architecture of FIG. 6 (e.g. a user device), which can facilitate the functionality of the display graphics controller 601, the social media object input 602, and the touch controller/touch hardware 603.

In an example implementation wherein the computer device 1005 is configured to facilitate the functionality of the client side of the system architecture, processor(s) 1010 can be configured to execute a social media application to provide for display one or more social media objects as illustrated in FIG. 4 and FIGS. 5A and 5B. In such an example implementation, the processor(s) 1010 can be configured to provide a first interface configured to receive first data that includes first social media information utilized in a first facet of a social media object, the first facet configured to be displayed publicly through a social media application and provide a second interface configured to receive second data comprising second social media information utilized in a secondary facet of the social media object and access information indicative of one or more users of the social media application having access to the secondary facet as illustrated in FIGS. 5A to 5C. Upon receiving such data to generate the social media object, processor(s) 1010 can be configured to generate the social media object either locally or through an exchange with the server side such that the social media object includes the first facet and the secondary facet, and provide the social media object to the social media application. The social media application can be any social media application configured to display the first facet of the social media object and to transition the social media object from the first facet to the secondary facet only to the one or more users of the social media application having access to the secondary facet. Examples of the first social media information and the second social media information can include text, video, images or any other media that can be provided through an interface of a social media application.

In an example implementation wherein the computer device 1005 is configured to facilitate the functionality of the client side of the system architecture, processor(s) 1010 can be configured to display social media objects as illustrated in FIGS. 1, 2 and 4 to display another first facet of another social media object through the social media application. Processor(s) 1010 facilitating the social media application can process an input to the another social media object to transition the another social media object from the another first facet to another secondary facet of the social media object as illustrated in FIG. 2, and then transition the social media object to display the another secondary facet if access is allowed as illustrated in FIG. 2. Such input may be made, for example, by a gesture made on a touch screen or through other methods depending on the desired implementation.

In example implementations, computer device 1005 is configured to facilitate the functionality of the server side of the system architecture of FIG. 6 (e.g. a server, a cloud, a data center, etc.), which can facilitate the functionality of the video/audio processing 604, the interface controller processor 605, the user access control storage/encryption 606 and the application layer 607 to provide social media application functionality to the client side as illustrated in FIG. 8.

In an example implementation wherein the computer device 1005 is configured to facilitate the functionality of the server side of the system architecture, processor(s) 1010 can be configured to provide a social media object to a social media application executed on the client side that includes a first facet configured to be displayed publicly through a social media application, wherein the first facet is linked to a secondary facet configured to be accessible through the first facet by an input to the social media object as illustrated in FIGS. 1 and 2. Processor(s) 1010 can further process input to the social media object at the client side to transition the first facet to the secondary facet by determining if access is to be granted to the secondary facet; and for a determination that access is to be granted, configuring the social media application to transition the social media object from the first facet to the secondary facet as illustrated, for example, in FIGS. 9A and 9B.

In an example implementation wherein the computer device 1005 is configured to facilitate the functionality of the server side of the system architecture, memory 1015 can be configured to maintain an access control list for the secondary facet, the access control list indicative of one or more users of the social media application that has access to the secondary facet as illustrated in FIG. 9A. Processor(s) 1010 can be configured to determine if the access is to be granted to the secondary facet is based on determining if a user associated with the input to the social media object is indicated as having access from the access control list by referring to memory 1015. As illustrated in FIG. 9A, the access control list can include one or more encryption keys indicative of the one or more users of the social media application that has access to the secondary facet; and processor(s) 1010 can be configured to determine if the access is to be granted to the secondary facet by determining an encryption key associated with the user associated with the input to the social media object; and determining that the access is to be granted for the encryption key being in the access control list as illustrated, for example, in FIG. 9B.

In an example implementation wherein the computer device 1005 is configured to facilitate the functionality of the server side of the system architecture, processor(s) 1010 can be further configured to generate the social media object based on first data from a first interface and second data from a second interface by facilitating the functionality to the client side as illustrated in FIGS. 5A and 5B. The first data can include first social media information utilized in the first facet, the second data can include second social media information utilized in the secondary facet and access information indicative of one or more users of the social media application having access to the secondary facet as illustrated in FIGS. 5A and 5B. Examples of the first social media information and the second social media information can include text, video, images or any other media that can be provided through an interface of a social media application. Such input may be made, for example, by a gesture made on a touch screen at the client side or through other methods depending on the desired implementation.

Finally, some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium storing processor-executable instructions configured to cause a processor of an apparatus to execute a process, the instructions comprising:
    providing a social media object comprising a first facet configured to be displayed
    publically through a social media application, the first facet linked to a secondary facet
    configured to be accessible through the first facet by an input to the social media object;
    for a processing of the input to the social media object to transition the first facet to the secondary facet:
    determining if access is to be granted to the secondary facet; and
    for a determination that access is to be granted, configuring the social media application to transition the social media object from the first facet to the secondary facet;
    maintaining an access control list for the secondary facet, the access control list indicative of one or more users of the social media application that has access to the secondary facet, wherein the access control list comprises one or more encryption keys indicative of the one or more users of the social media application that has access to the secondary facet;
    wherein the determining if the access is to be granted to the secondary facet is based on determining if a user associated with the input to the social media object is indicated as having access from the access control list;
    wherein the determining if the access is to be granted to the secondary facet comprises:
        determining an encryption key associated with the user associated with the input to the social media object; and
        determining that the access is to be granted for the encryption key being in the access control list.

2. The non-transitory computer readable medium of claim 1, further comprising generating the social media object based on first data from a first interface and second data from a second interface, the first data comprising first social media information utilized in the first facet, the second data comprising second social media information utilized in the secondary facet and access information indicative of one or more users of the social media application having access to the secondary facet.

3. The non-transitory computer readable medium of claim 2 wherein the first social media information and the second social media information comprises at least one of text, a video and an image input to the first interface and the second interface.

4. The non-transitory computer readable medium of claim 1, wherein the input to the social media object comprises a gesture made on a touch screen.

5. An apparatus, comprising:
    a hardware processor, configured to:
        provide a social media object comprising a first facet configured to be displayed publically through a social media application, the first facet linked to a secondary facet configured to be accessible through the first facet by an input to the social media object;
        for a processing of the input to the social media object to transition the first facet to the secondary facet:
        determine if access is to be granted to the secondary facet; and for a determination that access is to be granted, configure the social media application to transition the social media object from the first facet to the secondary facet: and a memory configured to store an access control list for the secondary facet, the access control list indicative of one or more users of the social media application that has access to the secondary facet, wherein the access control list comprises one or more encryption keys indicative of the one or more users of the social media application that has access to the secondary facet;

wherein the processor is configured to determine if the access is to be granted to the secondary facet based on determining if a user associated with the input to the social media object is indicated as having access from the access control list;

wherein the processor is configured to determine if the access is to be granted to the secondary facet by:

determining an encryption key associated with the user associated with the input to the social media object: and determining that the access is to be granted for the encryption key being in the access control list.

6. The apparatus of claim 5, wherein the processor is further configured to generate the social media object based on first data from a first interface and second data from a second interface, the first data comprising first social media information utilized in the first facet, the second data comprising second social media information utilized in the secondary facet and access information indicative of one or more users of the social media application having access to the secondary facet.

7. The apparatus of claim 6, wherein the first social media information and the second social media information comprises at least one of text, a video and an image input to the first interface and the second interface.

8. The apparatus of claim 5, wherein the input to the social media object comprises a gesture made on a touch screen.

9. A non-transitory computer readable medium storing processor-executable instructions configured to cause a processor of an apparatus to execute a process, the instructions comprising:

providing a first interface configured to receive first data comprising first social media information utilized in a first facet of a social media object, the first facet configured to be displayed publically through a social media application;

providing a second interface configured to receive second data comprising second social media information utilized in a secondary facet of the social media object and access information indicative of one or more users of the social media application having access to the secondary facet;

generating the social media object, the social media object comprising the first facet and the secondary facet, and providing the social media object to the social media application, the social media application configured to display the first facet of the social media object and to transition the social media object from the first facet to the secondary facet only to the one or more users of the social media application having access to the secondary facet;

wherein the social media application maintains an access control list for the secondary facet, the access control list indicative of the one or more users of the social media application that has access to the secondary facet, wherein the access control list comprises one or more encryption keys indicative of the one or more users of the social media application that has access to the secondary facet;

wherein the social media application determins if the access is to be granted to the secondary facet based on determining if a user associated with the input to the social media object is indicated as haying access from the access control list; wherein the determining if the access is to be granted to the secondary facet comprises:

determining an encryption key associated with the user associated with the input to the social media object; and determining that the access is to be granted for the encryption key being in the access control list.

10. The non-transitory computer readable medium of claim 9, wherein the first social media information and the second social media information comprises at least one of text, a video and an image input to the first interface and the second interface.

11. The non-transitory computer readable medium of claim 9, the instructions further comprising:

displaying another first facet of another social media object through the social media application;

processing an input to the another social media object to transition the another social media object from the another first facet to another secondary facet of the social media object;

transition the social media object to display the another secondary facet for access being granted to the another secondary facet.

12. The non-transitory computer readable medium of claim 11, wherein the input to the social media object comprises a gesture made on a touch screen.

* * * * *